(12) United States Patent
Inotsuka

(10) Patent No.: US 9,659,725 B2
(45) Date of Patent: May 23, 2017

(54) SWITCH

(71) Applicant: Valeo Japan Co., Ltd., Saitama (JP)

(72) Inventor: Tetsuya Inotsuka, Tokyo (JP)

(73) Assignee: Valeo Japan Co., Ltd. (JP)

( * ) Notice: Subject to any disclaimer, the term of this patent is extended or adjusted under 35 U.S.C. 154(b) by 57 days.

(21) Appl. No.: 14/332,535

(22) Filed: Jul. 16, 2014

(65) Prior Publication Data

US 2015/0027865 A1   Jan. 29, 2015

(30) Foreign Application Priority Data

Jul. 29, 2013 (JP) ................................ 2013-157204

(51) Int. Cl.

| H01H 3/16 | (2006.01) |
|---|---|
| H01H 19/14 | (2006.01) |
| F16H 59/10 | (2006.01) |
| H01H 19/08 | (2006.01) |
| H01H 3/06 | (2006.01) |
| H01H 19/20 | (2006.01) |
| H01H 19/58 | (2006.01) |

(52) U.S. Cl.
CPC ........... *H01H 19/14* (2013.01); *F16H 59/105* (2013.01); *H01H 3/06* (2013.01); *H01H 19/08* (2013.01); *H01H 3/16* (2013.01); *H01H 19/20* (2013.01); *H01H 19/58* (2013.01); *H01H 2300/02* (2013.01)

(58) Field of Classification Search
CPC .... H01H 2009/066; H01H 21/28; H01H 3/16; H01H 13/18; H01H 19/18

USPC .................................. 200/61.88, 47, 302.1
See application file for complete search history.

(56) References Cited

U.S. PATENT DOCUMENTS 5,848,344 A   12/1998 Milillo et al.
2006/0032343 A1   2/2006 Putney et al.

FOREIGN PATENT DOCUMENTS

| JP | 2011-038568 | | 2/2011 | |
|---|---|---|---|---|
| JP | 2011038568 | * | 2/2011 | ............. H01H 19/58 |
| JP | 2012-074310 A | | 4/2012 | |

OTHER PUBLICATIONS

Extended European Search Report issued Feb. 13, 2015 for corresponding European Application No. 14 17 7336.

* cited by examiner

*Primary Examiner* — Renee S Luebke
*Assistant Examiner* — Ahmed Saeed
(74) *Attorney, Agent, or Firm* — Fishman Stewart PLLC

(57) ABSTRACT

An inhibiter switch is configured to include a fixed contact point that is connected to and disconnected from a movable contact point. The movable contact point is configured to make pressure contact with the fixed contact point by the movement of a movable board by a shaft member, wherein a press-fit amount of the shaft member to a projecting portion is made smaller toward a connecting portion between the projecting portion and an inner periphery of an insert hole of the movable board.

8 Claims, 5 Drawing Sheets

SWITCH

CROSS-REFERENCE TO RELATED APPLICATION

This application claims priority under 35 USC 119 from Japanese Patent Application No. 157204/2013 filed on Jul. 29, 2013, the disclosure of which is incorporated by reference herein.

BACKGROUND OF THE INVENTION

Field of the Invention

The present invention relates to a switch.

Description of the Related Art

Japanese Patent Laid-Open Publication No. 2011-38568 discloses an inhibitor switch that is mounted on a vehicular automatic transmission to detect a selection range of a shift lever.

FIG. 4 is an exploded perspective view explaining the configuration of an inhibiter switch 10 according to the conventional example that is represented by the inhibiter switch disclosed in Japanese Patent Laid-Open Publication No. 2011-38568. It should be noted that the periphery of a shaft portion 51 in a movable board 5 is illustrated by a cross section.

The movable board 5 provided with movable contact points 7 is provided inside a body case 4 of the inhibiter switch 10 to be rotatable around an axis line X therein, and the movable board 5 includes the cylindrical shaft portion 51 and a contact point holding portion 52 extending in a radial direction (radial direction of the axis line X) from the shaft portion 51.

The shaft portion 51 has an insert hole 55 in which a rotary shaft 91 of a manual shaft 9 is inserted, and joint portions 56 to the metallic rotary shaft 91 are formed in the insert hole 55 to project out of an inner periphery 55a of the insert hole 55 (refer to FIG. 5A).

In the insert hole 55, the rotary shaft 91 is jointed to the movable board 5 in the insert hole 55 by press-fitting a width portion of across flat 92 composed of a pair of planar portions 93 in the joint portions 56, and in this state, the manual shaft 9 and the movable board 5 are jointed to be incapable of rotating relative to each other.

FIGS. 5A, 5B and 5C are diagrams explaining the joint between the shaft portion 51 of the movable board 5 and the width portion of across flat 92 by press fit, wherein FIG. 5A is a cross section made by cutting the shaft portion 51-side of the movable board 5 with a plane A in FIG. 4 and a diagram explaining a general configuration of the joint portions 56 formed in the shaft portion 51 of the movable board 5, FIG. 5B is an enlarged diagram of an essential part in FIG. 5A, and FIG. 5C is a diagram explaining the configuration of the joint portions 56 formed in the shaft portion 51 of the movable board 5 disclosed in Japanese Patent Laid-Open Publication No. 2011-38568.

As shown in FIG. 5A, the joint portions 56 are formed in the insert hole 55 of the shaft portion 51 to project inward from the inner periphery 55a of the insert hole 55, and are provided to be symmetrical across a diameter line Lm of the insert hole 55.

Each of the joint portion 56 has both side portions across a straight portion 561 positioned in the center in the longitudinal direction (right-left direction in the figure) and both the side portions project closer to the diameter line Lm than the straight portion 561. The portions projecting closer to the diameter line Lm form press-fit portions 57A in which the width portion of across flat 92 of the manual shaft 9 is press-fitted.

Each of tip surfaces 571 of the press-fit portions 57A is formed as a planar surface in parallel to the diameter line Lm, and a press-fit amount Wa of the width portion of across flat 92 to each of the press-fit portions 57A is equal over the entire length of the press-fit portion 57A in the longitudinal direction (direction of the diameter line Lm).

A diameter D1 of the rotary shaft 91 of the manual shaft 9 is slightly smaller than a diameter D2 of the insert hole 55 in the shaft portion 51, and each of the press-fit portions 57A of the movable board 5 has a section in which the width portion of across flat 92 of the manual shaft 9 is not press-fitted (section between an intersection point Px between the press-fit portion 57A and the width portion of across flat 92, and a connecting portion 571a between the press-fit portion 57A and the inner periphery 55a of the insert hole 55: refer to an area A in FIG. 5B).

Here, when the width portion of across flat 92 of the manual shaft 9 is press-fitted between the press-fit portions 57A, stress in a direction of separating the press-fit portions 57A from each other (direction of widening the insert hole 55) acts on the press-fit portions 57A (refer to an arrow B in the figure).

This stress concentrates on the connecting portion 571b between each of the press-fit portions 57A and the inner periphery 55a of the insert hole 55, which possibly causes cracks CK on a basis of the connecting portion 571b to be generated or the shaft portion 51 to be broken.

In the inhibiter switch according to Japanese Patent Laid-Open Publication No. 2011-38568, as shown in FIG. 5C an arc-shaped notch portion 58 is formed in the connecting portion between a press-fit portion 57B and the inner periphery 55a of the insert hole 55, which alleviates stress concentration due to the press fit to prevent fracture of the shaft portion 51 or generation of the crack on the shaft portion 51.

Here, when rotation of the movable board 5 around the axis line X is repeated by the manual shaft 9, the support of the manual shaft 9 (rotary shaft 91) in the movable board 5 is gradually weaken due to aging of the press-fit portions 57B of the movable board 5.

In a case of the inhibiter switch in Japanese Patent Laid-Open Publication No. 2011-38568, a length La of the press-fit portion 57B in a direction of a diameter line Lm is shorter than a length Lb of the conventional press-fit portion 57A as shown in FIG. 5B, and a length (press-fit length) of the press-fit portion 57B involved in the support is made small.

Therefore, when the support of the rotary shaft 91 (metallic shaft member) in the manual shaft 9 becomes weak due to the aging of the plastic press-fit portions 57B, the looseness of the movable board 5 to the manual shaft 9 becomes larger than in the conventional inhibiter switch.

Therefore, there is a need of preventing the fracture of the movable board at the time of press-fitting a metallic shaft member, and at the same time, as well as suppressing generation of the time-dependent looseness of the movable board.

SUMMARY OF THE INVENTION

Accordingly, the present invention is made in view of the above-described problems, and an object of the present invention is to provide a switch which can appropriately prevent the fracture of a movable board at the time of press-fitting a metallic shaft member, and suppress generation of the time-dependent looseness of the movable board.

According to an aspect of the present invention, a switch comprises a movable contact point, a movable board provided with the movable contact point, a shaft member that moves the movable board, the shaft member being jointed to the movable board by being press-fitted in a projecting portion projecting from an inner periphery of an insert hole in the movable board, and a fixed contact point that is connected to/disconnected from the movable contact point by causing the movable contact point making pressure contact with the fixed contact point to move by the movement of the movable board by the shaft member, wherein a press-fit amount of the shaft member to the projecting portion is made smaller toward a connecting portion between the projecting portion and the inner periphery of the insert hole.

According to the aspect of the present invention, since the press-fit amount of the shaft member to the projecting portion is made smaller toward the connecting portion between the projecting portion and the inner periphery of the insert hole, stress acting on the projecting portion at the press-fitting of the shaft member is made smaller toward the connecting portion between the projecting portion and the inner periphery of the insert hole. Consequently, since the stress acting on the connecting portion at the press-fitting of the shaft member can be made small, it is possible to appropriately prevent the movable board from breaking on a basis of the connecting portion by the stress at the press-fitting at the time of jointing the shaft member and the movable board.

Further, since the length of the projecting portion involved in the press fit can be longer as compared to a case where the vicinity of the connecting portion between the projecting portion and the inner periphery of the insert hole is largely notched, it is possible to appropriately suppress an influence of the looseness that is generated in a case where the support of the shaft member is degraded due to the aging of the projecting portion in which the shaft member is press-fitted.

BRIEF DESCRIPTION OF THE DRAWINGS

Other objects, features, and advantages of the present invention will become more apparent from the following detailed description made with reference to the accompanying drawings, in which like parts are designated by like reference numbers and in which:

FIGS. 1A and 1B are diagrams for explaining an inhibiter switch according to an embodiment in the present invention, wherein FIG. 1A is a perspective view showing the inhibiter switch according to the embodiment, and FIG. 1B is a cross section taken along a plane A in FIG. 1A and showing the inhibiter switch;

DESCRIPTION OF THE PREFERRED EMBODIMENT

Hereinafter, a switch according to an embodiment in the present invention will be explained by taking an inhibiter switch 1 mounted on a vehicle to be used for detection of a selection range of a shift lever, as an example.

Figures 1A, 1B:
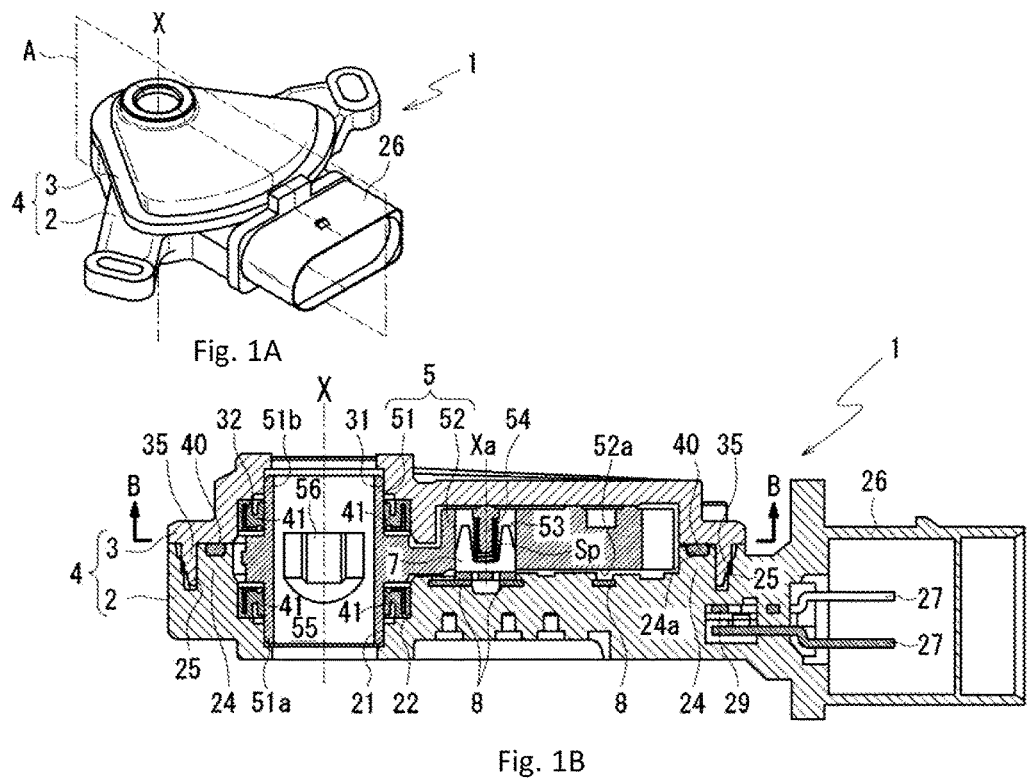
Figure 4:
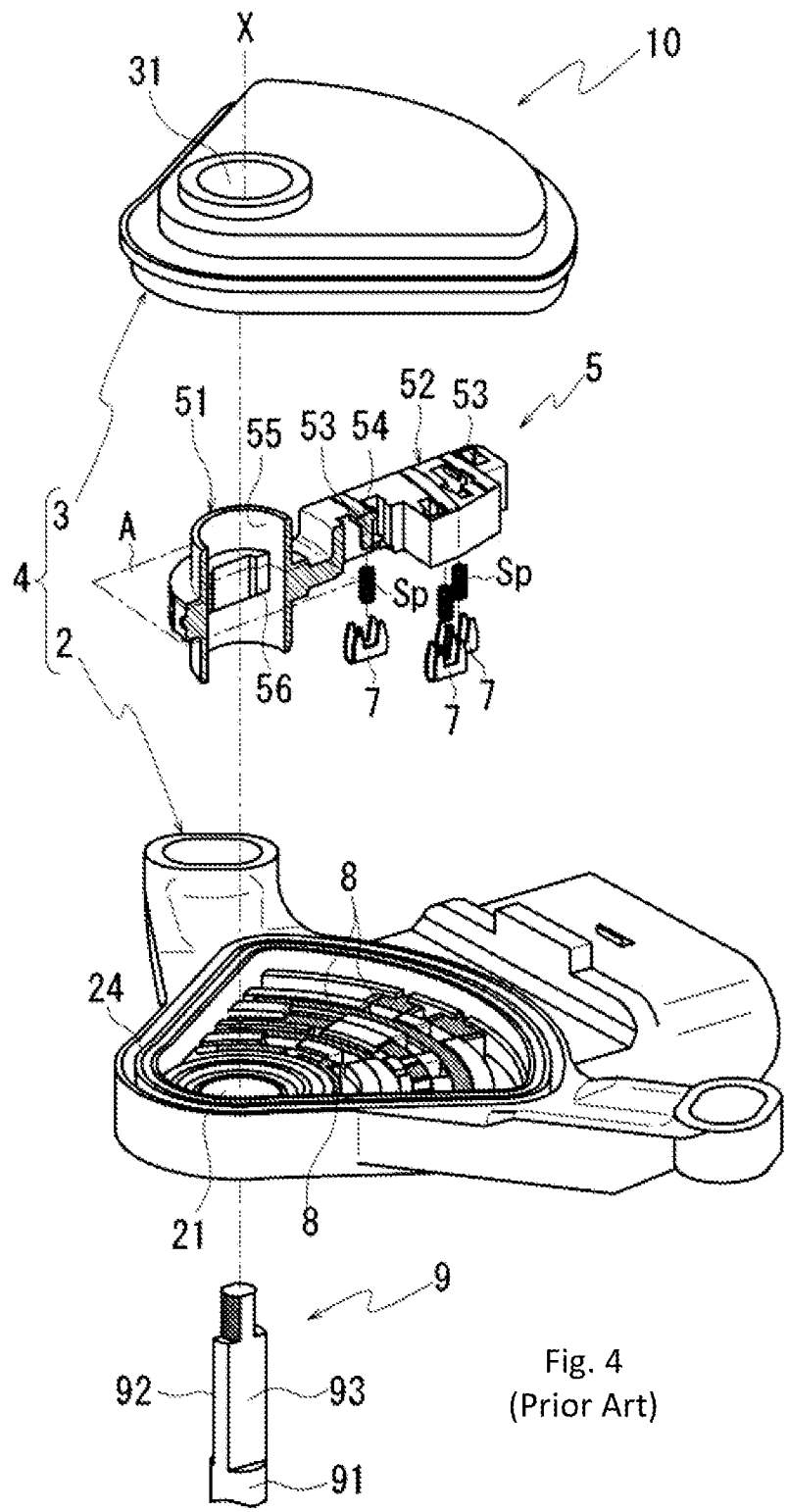
FIG. 4 is diagrams explaining an inhibiter switch according to the conventional art.

FIGS. 1A and 1B are diagrams explaining the inhibiter switch 1 according to the embodiment in the present invention. It should be noted that in the following explanation, components identical to those in the inhibiter switch 10 according to the conventional example shown in FIG. 4 are referred to as identical codes. Further, for descriptive purposes, in FIG. 1B a cover 3-side is indicated as an upward side and a pole board 2-side is indicated as a downward side.

As shown in FIGS. 1A and 1B, a body case 4 of the inhibiter switch 1 is formed by coupling a cover 3 to a peripheral wall 24 surrounding an area of a pole board 2 in which fixed contact points 8 are disposed, and a movable board 5 provided with movable contact points 7 is provided inside the body case 4 to be rotatable around an axis line X.

The movable board 5 includes a cylindrical shaft portion 51 and a contact point holding portion 52 linearly extending in a radial direction of the axis line X from the halfway position of the shaft portion 51 in the longitudinal direction, and the shaft portion 51 and the contact point holding portion 52 are integrally formed of non-conductive plastic materials that are excellent in heat resistance.

Accommodation holes 53 for the movable contact points 7 are formed in the contact point holding portion 52 to open downward to the pole board 2-side, and a spring S is attached in the accommodation hole 53 such that one end of the spring Sp in the longitudinal direction abuts against the movable contact point 7 and the other end is inserted to be positioned around a cylindrical spring holding portion 54.

The movable contact point 7 projects downward to the pole board 2-side from the accommodation hole 53, and makes pressure contact with the fixed contact point 8 exposed on an upper surface of the pole board 2 by an urging force acting from the spring Sp.

Here, the movable board 5 according to the embodiment is provided with a total of the three movable contact points 7, and each of the movable contact points 7 is provided in the accommodation hole 53 having the same configuration as the above-mentioned configuration.

The pole board 2 is integrally formed of a non-conductive plastic material that is excellent in heat resistance, and wiring members 29 connecting a connector terminal 27 of a connector portion 26 and each fixed contact point 8 are provided inside the pole board 2 by insert molding.

The peripheral wall 24 surrounding the area where the fixed contact points 8 are provided is formed on the upper surface of the pole board 2 to project upward to the cover 3-side, and a fitting groove 25 surrounding the peripheral wall 24 over the entire periphery is formed outside of the peripheral wall 24.

A circular fitting wall 35 disposed in the cover 3-side is fitted in the fitting groove 25 when the pole board 2 and the cover 3 are assembled, and at this time, abutment portions between the outer periphery of the fitting wall 35 and the fitting groove 25 are jointed to each other, for example, by ultrasonic welding to form the body case 4. It should be noted that the cover 3 is also formed of a non-conductive plastic material that is excellent in heat resistance as similar to the pole board 2.

The plurality of fixed contact points 8 are provided inside the peripheral wall 24 in the pole board 2 to be exposed on the upper surface of the cover 3-side. Each of the fixed contact points 8 extends at a position spaced radially outside by a predetermined distance from the axis line X to have a different length along the circumferential direction around the axis line X, and is formed in an arc shape in a plane view (refer to FIG. 4).

The area inside the peripheral wall 24 where the fixed contact points 8 are provided is formed in a substantially fan-shape in a plane view, and a through hole 21 is provided in a section of the peripheral wall 24 corresponding to the fan top to penetrate through the pole board 2 in the thickness direction. A through hole 31 is provided also in the cover 3 assembled in the pole board 2 at a position matching the through hole 21 to penetrate through the cover 3 in the thickness direction.

Ring-shaped accommodation portions 22 and 32 respectively surrounding the through holes 21 and 31 by a predetermined interval are formed on the upper surface of the pole board 2 in the cover 3-side and on the lower surface of the cover 3 in the pole board 2-side, and seal rings 41 are attached inside the accommodation portions 22 and 32 to be fitted therein.

In the inhibiter switch 1 in the embodiment, one end 51a of the shaft portion 51 in the movable board 5 and the other end 51b thereof are supported by the through holes 21 and 31 to be rotatable around the axis line X, and at this time, the seal rings 41 provided in the accommodation portions 22 and 32 make pressure contact with the outer periphery of the shaft portion 51, thus ensuring air-tightness in the body case 4.

Figures 2A, 2B:
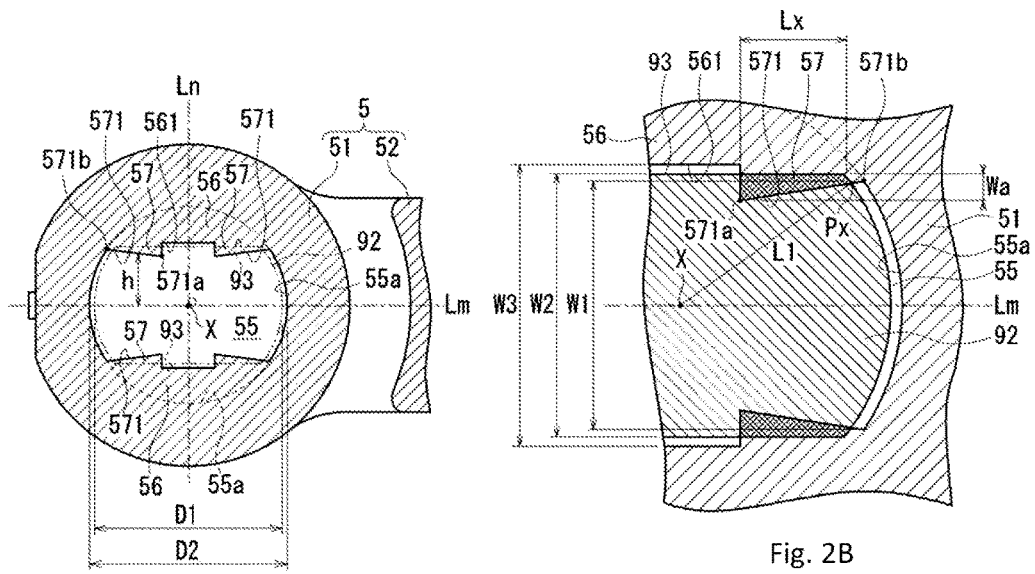
FIG. 2A is a cross section view taken along line B-B in FIG. 1B and showing a shaft portion side of a movable board according to the embodiment.
FIG. 2B is a diagram explaining sections of connecting portions in a shaft portion, wherein a width portion of across flat of a manual shaft is press-fitted in the sections.

FIG. 2A is a cross section taken along line B-B in FIG. 1B and showing the movable board 5 in the shaft portion 51-side. FIG. 2B is a diagram explaining sections of joint portions 56 in the shaft portion 51, wherein a width portion of across flat 92 of a manual shaft 9 is press-fitted in the sections. It should be noted that in FIG. 2B, the width portion of across flat 92 shown in a virtual line in FIG. 2A is shown in sectional view, and the sections in the connecting portions 56 where the width portion of across flat 92 is press-fitted are shown by a hatching different from those in the shaft portion 51 and the width portion of across flat 92.

As shown in FIG. 1B, an insert hole 55 in which the rotary shaft 91 of the manual shaft 9 is inserted is formed in the shaft portion 51 of the movable board 5 to penetrate therethrough in the longitudinal direction (axis line X), and the joint portions 56 to the rotary shaft 91 are provided in the central part of the insert hole 55 in the longitudinal direction.

As shown in FIG. 2A, the two joint portions 56 are provided in the insert hole 55, and these joint portions 56 are symmetrical across a diameter line Lm of the insert hole 55.

The joint portion of the rotary shaft 91 to the joint portions 56 is formed as the width portion of across flat 92 provided with a pair of planar portions 93 composed of linear outer peripheries as viewed from the axial direction of the axis line X. The pair of planar portions 93 are formed to be symmetrical across the diameter line Lm of the rotary shaft 91, and the rotary shaft 91 is configured to be jointed to the movable board 5 by press-fitting the width portion of across flat 92 between the joint portions 56 of the movable board 5.

The joint portions 56 are formed to project inward from the arc-shaped inner periphery 55a of the insert hole 55, and each has a straight portion 561 in parallel to the diameter line Lm at the central portion thereof in the longitudinal direction (right-left direction in the figure).

In each of the joint portions 56, both side portions thereof having the straight portion 561 therebetween project closer to the diameter line Lm than the straight portion 561, sections of which project closer to the diameter line Lm are formed as press-fit portions 57 in which the width portion of across flat 92 (planar portions 93) of the rotary shaft 91 is press-fitted.

A tip surface 571 of the press-fit portion 57 is formed as an inclined surface that is inclined in a direction in which a spaced-apart distance h from the diameter line Lm becomes larger toward a connecting portion 571b to the inner periphery 55a of the insert hole 55 from an end portion 571a in the straight portion 561-side as viewed from the axial direction of the axis line X, and is formed as a straight line shape successive from the end portion 571a in the straight portion 561-side to the connecting portion 571b to the inner periphery 55a.

In the embodiment, the press-fit portions 57 are formed to be symmetrical across a diameter line Ln of the insert hole 55 perpendicular to the aforementioned diameter line Lm.

Here, as shown in FIG. 2B, a spaced-apart distance W3 between the straight portions 56 opposing across the diameter line Lm is larger than a thickness W2 of the width portion of across flat 92 in the rotary shaft 91, and a spaced-apart distance W1 between the connecting portions 571b of the press-fit portions 57 opposing across the axis line X is slightly smaller than the thickness W2 of the width portion of across flat 92.

Therefore, when the rotary shaft 91 is inserted in the insert hole 55 of the movable board 5, the width portion of across flat 92 of the rotary shaft 91 is press-fitted between the press-fit portions 57 positioned symmetrically across the diameter line Lm to cause the movable board 5 and the rotary shaft 91 to be jointed in such a manner as to be not rotatable relative to each other.

As described above, the press-fit portion 57 which has the spaced-apart distance h from the diameter line Lm becomes larger toward the connecting portion 571b to the inner periphery 55a of the insert hole 55 from the end portion 571a in the straight portion 561-side, and the press-fitting amount Wa of the width portion of across flat 92 press-fitted between the press-fit portions 57 is smaller toward the connecting portion 571b to the inner periphery 55a of the insert hole 55 from the end portion 571a in the straight portion 561-side.

Therefore, stress generated by press fit acting on the press-fit portion 57 at the time of press-fitting the width portion of across flat 92 between the press-fit portions 57 is made smaller toward the connecting portion 571b to the inner periphery 55a of the insert hole 55, and stress acting on the connecting portion 571b between the press-fit portion 57 and the inner periphery 55a of the insert hole 55 is also made small.

An explanation will be made of an operation of the embodiment with reference to FIGS. 2A and 2B and FIGS. 3A and 3B.

Figures 3A, 3B:
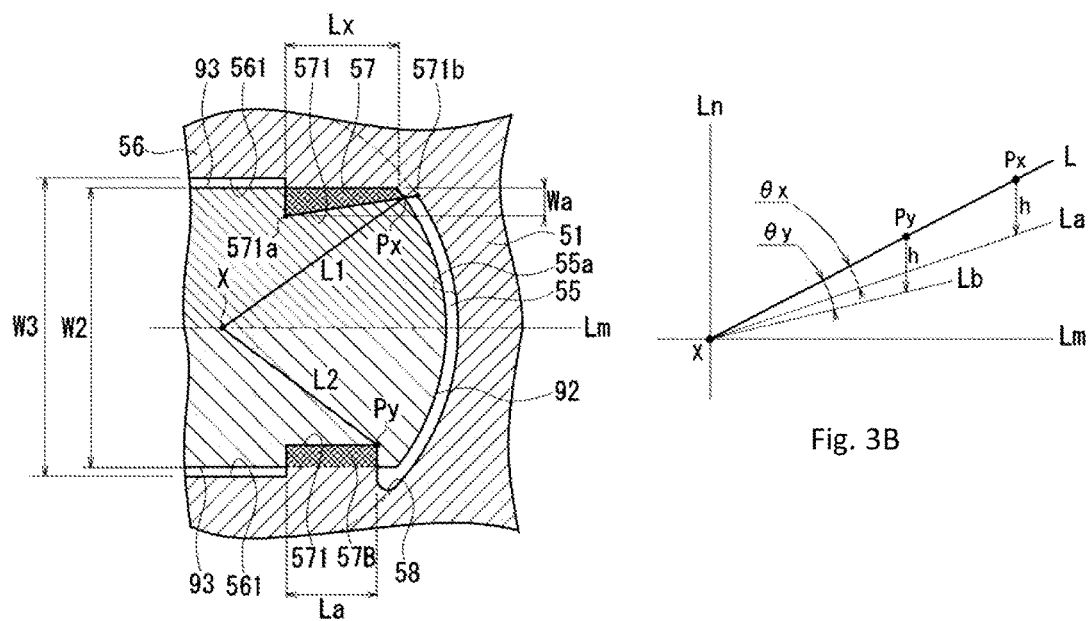
FIGS. 3A and 3B are diagrams explaining an operation of press-fit portions according to the embodiment.

FIGS. 3A and 3B are diagrams explaining an operation in a case of the press-fit portions 57 according to the embodiment. In FIG. 3A, an upper half from the diameter line Lm of the insert hole 55 shows a state where the width portion of across flat 92 of the rotary shaft 91 is press-fitted between the press-fit portions 57 according to the embodiment, and a lower half from the diameter line Lm of the insert hole 55 shows a state where the width portion of across flat 92 of the rotary shaft 91 is press-fitted between the press-fit portions 57B as disclosed in Japanese Patent Laid-Open Publication No. 2011-38568. FIG. 3B is a diagram explaining a relation between a distance from a rotation center (axis line X) of the rotary shaft 91 and an angular deviation thereof.

As shown in FIGS. 2A and 2B, when the width portion of across flat 92 provided in the rotary shaft 91 of the manual shaft 9 is inserted between the joint portions 56 provided in the shaft portion 51 of the movable board 5, the pair of planar portions 93 forming the width portion of across flat 92 are press-fitted between the press-fit portions 57 opposing across the diameter line Lm.

Here, each of the tip surfaces 571 of the press-fit portions 57 is inclined to the diameter line Lm of the insert hole 55, and each of the tip surfaces 571 is formed as the inclined surface that is inclined in a direction in which the spaced-apart distance h from the diameter line Lm becomes larger toward the connecting portion 571b to the inner periphery 55a of the insert hole 55 from the end portion 571a in the straight portion 561-side.

Therefore, the stress generated by the press fit acting on each of the press-fit portions 57 is maximized in the straight portion 561-side (end portion 571a-side), and is smaller toward the connecting portion 571b to the inner periphery 55a of the insert hole 55.

Therefore, stress acting on the connecting portion 571b between the press-fit portion 57 and the inner periphery 55a of the insert hole 55 at the time of press-fitting the width portion of across flat 92 between the press-fit portions 57 opposing across the diameter line Lm is also small.

Figure 5A:
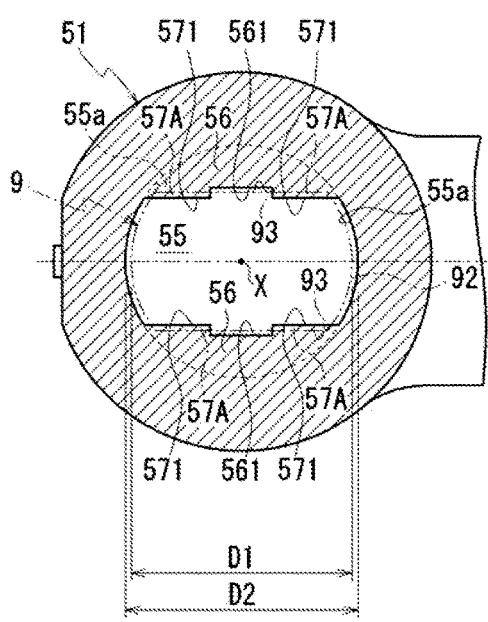
FIGS. 5A, 5B and 5C are diagrams showing the shaft portion periphery of a movable board according to the conventional art in an enlarged manner.
Figure 5B:
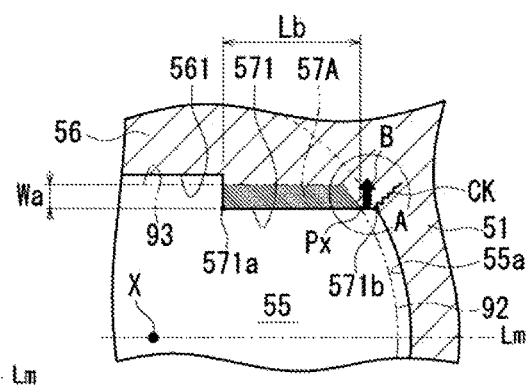

Thereby, it is possible to more appropriately suppress generation of cracks on a basis of the connecting portion 571b between the press-fit portion 57 and the inner periphery 55a of the insert hole 55 at the time of press-fitting the width portion of across flat 92 than in a case of the conventional press-fit portion 57 in which the press-fitting amount of the width portion of across flat 92 is equal over the entire length in the diameter line Lm (refer to FIG. 5B). Therefore, it is possible to appropriately suppress generation of fracture of the shaft portion 51 of the movable board 5 at press-fitting.

Further, a length Lx of the press-fit portion 57 involved in the support of the width portion of across flat 92 by press fit in the diameter line Lm (refer to FIG. 3A) is longer than a length La in a case of the press-fit portion 57B in which an arc-shaped notch portion 58 is formed on the connecting portion to the inner periphery 55a of the insert hole 55.

Figure 5C:
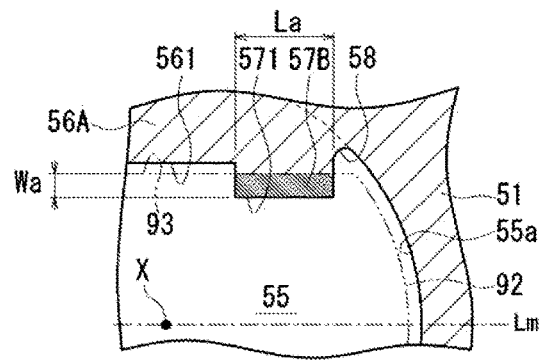

Therefore, even if the support of the rotary shaft 91 (metallic shaft member) of the manual shaft 9 is weaken due to aging of the plastic press-fit portions 57, since a length of the press-fit portion 57 shown in FIG. 2B which is involved in press fit is longer than that of the press-fit portion 57B shown in FIG. 5C, it is possible to suppress the looseness of the movable board 5 to the manual shaft 9.

Further, as shown in FIG. 3A, in a case of the press-fit portion 57 according to the embodiment, a distance L1 from the rotation center (axis line X) of the rotary shaft 91 (width portion of across flat 92) to an intersection point Px between an outer peripheral edge of the width portion of across flat 92 and the press-fit portion 57 is longer than a distance L2 in a case from the axis line X in the press-fit portion 57B disclosed in Japanese Patent Laid-Open Publication No. 2011-38568 to an intersection point Py.

Here, a relation between a looseness amount of the width portion of across flat due to aging of the plastic press-fit portion (looseness amount in a direction perpendicular to the diameter line Lm (looseness amount in a direction of the straight line Ln in FIG. 2A)) and a distance to an intersection point between the outer peripheral edge of the width portion of across flat and the press-fit portion will be explained by using FIG. 3B.

It should be noted that in FIG. 3B, an intersection point between the outer peripheral edge of the width portion of across flat 92 and the press-fit portion 57 is indicated at Px, and an intersection point between the outer peripheral edge of the width portion of across flat 92 and the press-fit portion 57B is indicated at Py, wherein a distance from the rotation center (axis line X) to each of the intersection points Px and Py is diametrically shown by a length from the rotation center (axis line X) on the straight line L.

In FIG. 3B, when the looseness amount of the width portion of across flat 92 due to the aging of the press-fit portion is the same amount h, an angular change around the rotation center (axis line X) is the larger as the distance from the rotation center (axis line X) is shorter.

For example, when the intersection points Px and Py on the same straight line L respectively deviate by the same amount h in the straight line Lm, the intersection points Px and Py result in being respectively positioned on different straight lines La and Lb passing through the rotation center (axis line X).

Angular changing amounts θx and θy around the rotation center (axis line X) of the intersection points Px and Py at this time are the larger as the intersection point is closer to the rotation center (axis line) (θy>θx).

In the inhibiter switch 1 according to the embodiment, the movable contact point 7 moving in the circumferential direction around the rotation center (axis center) with rotation of the movable board 5 is operated to be connected to/disconnected from the fixed contact point 8 in response to an angular position around the rotation center (axis line X).

Therefore, as the angular changing amount around the rotation center (axis line X) due to the looseness of the width portion of across flat 92 is larger, since a deviation between the angular position of the manual shaft 9 and the angular position of the movable contact point 7 supported by the movable board 5 is the larger, an influence on detection accuracy of an on/off operation of the inhibiter switch 1 becomes large.

As described above, in the press-fit portion 57 according to the embodiment, the distance L1 from the rotation center (axis line X) of the rotary shaft 91 (width portion of across flat 92) to the intersection point Px with the outer peripheral edge of the width portion of across flat 92 is longer than the distance L2 in a case of the press-fit portion 57B disclosed in Japanese Patent Laid-Open Publication No. 2011-38568.

Therefore, in a case where the looseness is generated in the width portion of across flat 92, since the changing amount around the rotation center X becomes smaller than in the press-fit portion 57B disclosed in Japanese Patent Laid-Open Publication No. 2011-38568, the influence of the generation of the looseness on the detection accuracy of the on/off operation of the inhibiter switch 1 is made smaller in accordance with that.

As described above, in the embodiment, the inhibiter switch 1 is configured such that the width portion of across flat 92 provided in the rotary shaft 91 (shaft member) of the manual shaft 9 is press-fitted between the press-fit portions 57 of the joint portions 56 projecting from the inner periphery 55a of the insert hole 55 in the insert hole 55 provided in the movable board 5 provided with the movable contact points 7 to be jointed to the movable board 5, and rotation of the movable board 5 by the manual shaft 9 causes the movable contact point 7 making pressure contact with the fixed contact point 8 to move in the circumferential direction around the rotation shaft (axis line X) of the movable board 5 and to connect/disconnect the movable contact point 7 and the fixed contact point 8 in response to the angular position around the rotary shaft of the movable contact point 7, wherein the press-fit amount of the width portion of across flat 92 to the press-fit portion 57 is made smaller toward the connecting portion 571*b* between the press-fit portion 57 and the inner periphery 55*a* of the insert hole 55.

With this configuration, since the press-fit amount of the width portion of across flat 92 of the manual shaft 9 to the press-fit portion 57 is made smaller toward the connecting portion 571*b* between the press-fit portion 57 and the inner periphery 55*a* of the insert hole 55, the stress acting on the press-fit portion 57 at the press-fitting of the width portion of across flat 92 is made smaller toward the connecting portion 571*b* to the inner periphery 55*a* of the insert hole 55.

Consequently, since the stress acting on the press-fit portion 57 by press fit at the time of press-fitting the width portion of across flat 92 of the manual shaft 9 is made smaller toward the connecting portion 571*b* to the inner periphery 55*a* of the insert hole 55, it is possible to suppress generation of cracks on a basis of the connecting portion 571*b* between the press-fit portion 57 and the inner periphery 55*a* of the insert hole 55. Accordingly, when the rotary shaft 91 of the manual shaft 9 is inserted in the insert hole 55 of the movable board 5, the width portion of across flat 92 of the manual shaft 9 is press-fitted between the press-fit portions 57 of the movable board 5 to cause the manual shaft 9 and the movable board 5 to be jointed in such a manner as to be not rotatable relative to each other. At this time, it is possible to appropriately prevent the shaft portion 51 of the movable board 5 from breaking by the stress at the press-fitting.

The inhibiter switch is configured such that the width portion of across flat 92 provided in the columnar rotary shaft 91 of the manual shaft 9 is formed by providing the planar portions 93 each forming a linear outer periphery as viewed from the axial direction of the rotary shaft 91 (axial direction of the axis line X) in parallel to each other across the axis line X, the press-fit portions 57 are provided to be symmetrical across the diameter line Lm of the insert hole 55 in the insert hole 55 of the movable board 5, the manual shaft 9 is jointed to the movable board 5 by press-fitting the width portion of across flat 92 between the press-fit portions 57 opposing across the diameter line Lm, and the tip surfaces 571 of the press-fit portions 57 opposing to each other are inclined in such a direction that the press-fitting amount of the width portion of across flat 92 (planar portion 93) to the press-fit portion 57 is made smaller toward the connecting portion 571*b* between the press-fit portion 57 and the inner periphery 55*a* of the insert hole 55.

With this configuration, the stress acting on the press-fit portions 57 by press fit is maximized in the straight portion 561-side (end portion 571*a*-side), and is made smaller toward the connecting portion 571*b* between the press-fit portion 57 and the inner periphery 55*a* of the insert hole 55. Therefore, at the time of press-fitting the width portion of across flat 92 between the press-fit portions 57, the stress acting on the connecting portion 571*b* between the press-fit portion 57 and the inner periphery 55*a* of the insert hole 55 is also made small.

Thereby it is possible to more appropriately suppress generation of cracks on a basis of the connecting portion 571*b* between the press-fit portion 57 and the inner periphery 55*a* of the insert hole 55 than in a case of the conventional press-fit portion 57A in which the press-fitting amount is equal over the entire length of the press-fit portion 57A in the diameter line Lm (refer to FIG. 5B). Accordingly, it is possible to appropriately suppress generation of the fracture of the shaft portion 51 of the movable board 5 at the press-fitting.

In a case of the press-fit portions 57 according to the embodiment, a length Lx of the press-fit portion 57 in the diameter line Lm involved in the support of the width portion of across flat 92 by the press fit is longer than a length La in a case of the press-fit portion 57B in which the arc-shaped notch portion 58 is formed on the connecting portion to the inner periphery 55*a* of the insert hole 55 (refer to FIG. 5C). Therefore, even if the support of the rotary shaft 91 (metallic shaft member) of the manual shaft 9 is weaken due to aging of the plastic press-fit portions 57, the looseness of the movable board 5 to the manual shaft 9 can be made smaller than in a case of the press-fit portion 57B.

Particularly in the inhibiter switch 1 configured such that the movable contact point 7 and the fixed contact point are connected/disconnected in response to the angular position of the movable contact point 7 in the circumferential direction around the rotation shaft (axis line X) thereof, when the looseness of the movable board 5 to the manual shaft 9 becomes large, a deviation between the angular position of the manual shaft 9 around the rotary shaft (axis line X) and the angular position of the movable contact point 7 (the movable board 5) around the rotary shaft (axis line X) is generated, thereby causing the detection accuracy of a position (selection range) selected by an operation of a shift lever to be degraded.

Here, as described above, the deviation between the angular position of the manual shaft 9 and the angular position of the movable contact point 7 is the smaller as the length L1 from the rotation center (axis line X) of the manual shaft 9 (width portion of across flat 92) to the intersection point Px between the outer peripheral edge of the width portion of across flat 92 and the press-fit portion 57 is longer.

In the inhibiter switch 1 according to the embodiment, the length L1 from the rotation center of the manual shaft 9 to the intersection point Px between the outer peripheral edge of the width portion of across flat 92 and the press-fit portion 57 is longer than the length L2 in a case of the press-fit portion 57B in which the arc-shaped notch portion 58 is formed on the connecting portion to the inner periphery 55*a* of the insert hole 55 (refer to FIG. 5C). Therefore, even if the support of the rotary shaft 91 (metallic shaft member) of the manual shaft 9 is weaken due to aging of the plastic press-fit portions 57, it is possible to suppress the deviation between the angular position of the manual shaft 9 and the angular position of the movable contact point 7. Therefore, the detection accuracy of a position (selection range) selected by an operation of a shift lever can be suppressed more than in the conventional art case.

The aforementioned embodiment exemplifies a case where the width portion of across flat 92 configured of the pair of planar portions 93 is provided in the joint portion between the rotary shaft 91 of the manual shaft 9 and the movable board 5 and is press-fitted between the press-fit portions 57 in the movable board 5-side, thus jointing the manual shaft 9 and the movable board 5 in such manner as to be not rotatable relative to each other.

A shape of the joint portion in the rotary shaft 91 is only required to be formed to be able to joint the manual shaft 9 and the movable board 5 in such manner as to be not rotatable relative to each other, and, for example, is only required to be formed to provide at least one planar portion 93 formed as a linear outer periphery as viewed from the axial direction in the axis line X.

For example, in a case where one planar portion 93 is provided, one press-fit portion in which the planar portion 93 is press-fitted in the insert hole 55 of the movable board 5 is provided to project inside the insert hole 55, and a flat surface (inclined surface) is provided in the press-fit portion, the flat surface being formed to be directed such that the press-fitting amount of the planar portion 93 is the smaller toward the connecting portion to the inner periphery 55a of the insert hole 55. Therefore, the above structure has the effect similar to that of a case of the aforementioned embodiment.

In addition, the joint portion in the rotary shaft 91 may be formed in a polygonal column shape, and each of the linear outer peripheral surfaces as viewed from the axial direction of the polygonal column may be press-fitted between the press-fit portions projecting from the inner periphery of the insert hole 55.

Further, the embodiment exemplifies a case where the present invention is applied to the inhibiter switch 1 configured such that the movable board 5 is provided to be movable in the circumferential direction around the axis line X and the movable contact point 7 making pressure contact with the fixed contact point 8 is moved in the circumferential direction around the axis line X with rotation of the movable board 5.

The present invention is preferably applicable to other switches, such as a switch structured such that the shaft member is jointed to the insert hole provided in the movable board by press fit, and the movable contact point making pressure contact with the fixed contact point is advanced/retreated by advance/retreat movement of the movable board, thus connecting/disconnecting the movable contact point and the fixed contact point.

While only the selected embodiment has been chosen to illustrate the present invention, it will be apparent to those skilled in the art from this disclosure that various changes and modifications can be made therein without departing from the scope of the invention as defined in the appended claims. Furthermore, the foregoing description of the embodiment according to the present invention is provided for illustration only, and not for the purpose of limiting the invention as defined by the appended claims and their equivalents.

1 Inhibiter switch
2 Pole board
3 Cover
4 Body case
5 Movable board
7 Movable contact point
8 Fixed contact point
9 manual shaft
10 Inhibiter switch
21 Through hole
22 Accommodation portion
24 Peripheral wall
25 Fitting groove
26 Connector portion
27 Connector terminal
29 Wiring member
31 Through hole
35 Fitting wall
41 Seal ring
51 Shaft portion
51a One end
51b Other end
52 Contact point holding portion
53 Accommodation hole
54 Spring holding portion
55 Insert hole
55a Inner periphery
56 Joint portion
57, 57A, 57B Press-fit portion
58 Notch portion
91 Rotary shaft
91 Shaft portion
92 Width portion of across flat
93 Planar portion
561 Straight portion
571 Tip surface
571a End portion
571b Connecting portion
CK Crack
D1 Diameter
D2 Diameter
Lm Diameter line
Ln Diameter line
Px Intersection point
Sp Spring
X Axis line
h Spaced-apart distance

What is claimed is:

1. A switch comprising: a movable contact point;
a movable board provided with the movable contact point;
a shaft member that moves the movable board, the shaft member being jointed to the movable board by being press-fitted in a projecting portion projecting from an inner periphery of an insert hole in the movable board; and
a fixed contact point that is connected to/disconnected from the movable contact point by causing the movable contact point making pressure contact with the fixed contact point to move by the movement of the movable board by the shaft member, wherein a press-fit amount of the shaft member to the projecting portion is made smaller toward a connecting portion between the projecting portion and the inner periphery of the insert hole;
wherein an inclined surface is formed in the projecting portion in such a direction that a press-fit amount of the planar portion to the projecting portion is made smaller toward the connecting portion as viewed from the axial direction.

2. The switch according to claim 1, wherein
a planar portion configured as a linear outer periphery as viewed from an axial direction of the shaft member is formed
in a joint portion to the projecting portion in the shaft member, the shaft member is jointed to the movable board by press-fitting the planar portion into the projecting portion.

3. The switch according to claim 2, wherein
the planar portion configured as the linear outer surface formed in the joint portion includes a pair of planar portions
provided to be symmetrical across a center shaft of the shaft member as viewed from the axial direction.

4. The switch according to claim 1, wherein
the movable board is provided to be movable around a center shaft of the shaft member, and the movable contact point making pressure contact with the fixed contact point is moved in a circumferential direction around the center shaft with rotation of the shaft member, thus connecting/disconnecting the movable contact point and the fixed contact point.

5. The switch according to claim 2, wherein the movable board is provided to be movable around a center shaft of the shaft member, and the movable contact point making pressure contact with the fixed contact point is moved in a circumferential direction around the center shaft with rotation of the shaft member, thus connecting/disconnecting the movable contact point and the fixed contact point.

6. The switch according to claim 3, wherein the movable board is provided to be movable around the center shaft of the shaft member, and the movable contact point making pressure contact with the fixed contact point is moved in a circumferential direction around the center shaft with rotation of the shaft member, thus connecting/disconnecting the movable contact point and the fixed contact point.

7. The switch according to claim 1, wherein the shaft member is press-fitted along an outer peripheral edge of the shaft member.

8. The switch according to claim 1, wherein the press-fit amount of the shaft member to the projecting portion is made smaller linearly.

* * * * *